June 20, 1939. P. HINTZ ET AL 2,163,120
BASKET COVER FASTENER
Filed Jan. 2, 1934
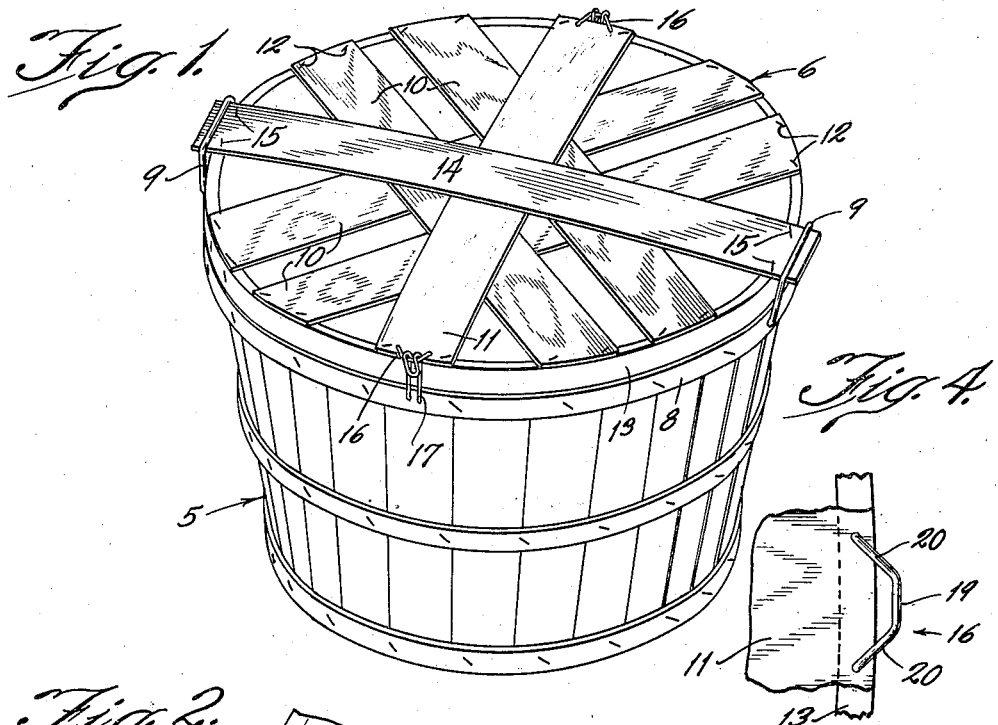
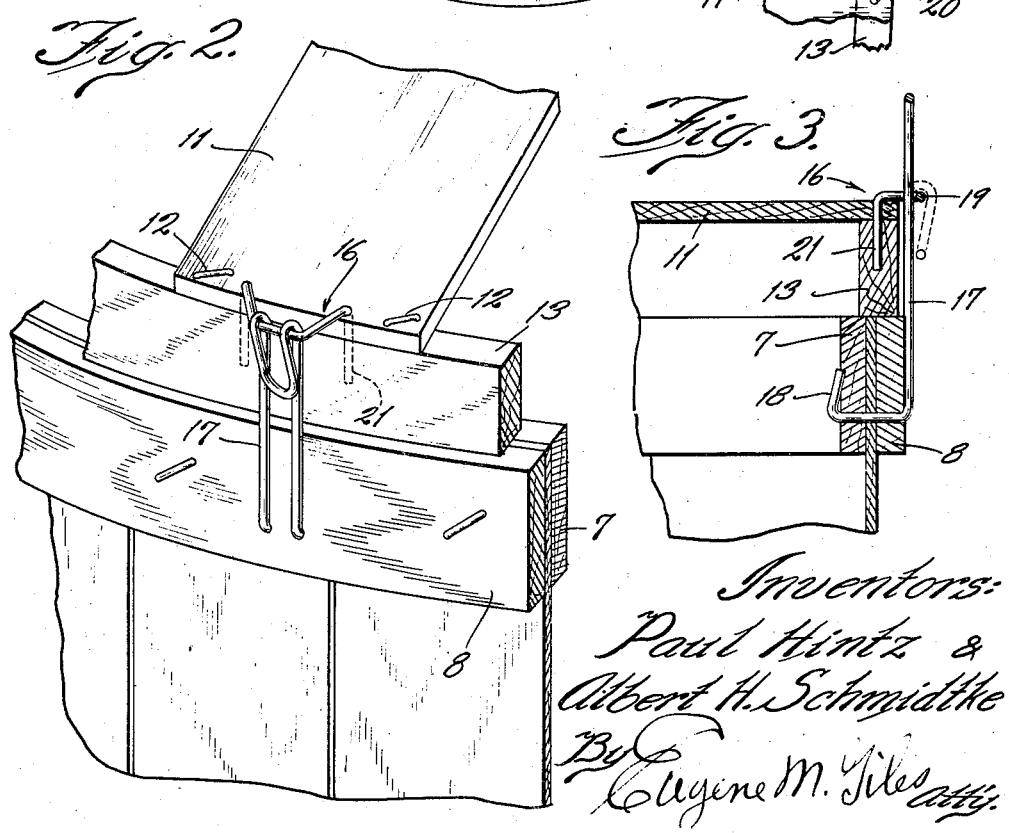
Inventors:
Paul Hintz &
Albert H. Schmidtke
By Eugene M. Tiles atty.

Patented June 20, 1939

2,163,120

UNITED STATES PATENT OFFICE 2,163,120

BASKET COVER FASTENER

Paul Hintz, Marshall, Tex., and Albert H. Schmidtke, St. Joseph, Mich., assignors to St. Joseph Iron Works, St. Joseph, Mich., a corporation of Michigan Application January 2, 1934, Serial No. 704,952

10 Claims. (Cl. 217—124)

Our invention relates to devices for fastening a basket cover to the basket side wall and has reference more particularly to companion members on the basket side wall and cover edge respectively, one of which interlocks with the other by bending to hold the cover down.

It is a common practice to provide baskets, especially those of the bushel basket type, with covers which are made of thin strips or panels secured at their outer ends to the upper edge of a marginal hoop. Such baskets are usually made with a pair of wire handles projecting upwardly above the upper edge of the basket at opposite sides, and the cover, which is of suitable size so that the depending marginal hoop thereof is located directly above the rim of the basket, has a top cross slat with projecting ends which are engaged in the basket handles for holding the cover in place on the basket. It is the prevailing practice, however, to fill such baskets heaping full so as to produce what is known as a bulge pack and when the cover is forced down over the basket contents and the projecting ends of the top cover slat are engaged with the basket handles, the cover is placed under considerable strain and bulges upwardly so that there is a considerable gap between the cover and basket midway around the sides thereof between the basket handles, and this is quite objectionable not only from the standpoint of appearance, but also because it exposes or permits access to the contents of the basket and oftentimes occasions considerable loss. It is desirable, therefore, and quite important to provide means for fastening the cover down to the basket at these points midway around the basket between the basket handles, and such midway fastening means and the connection thereof with the basket and cover not only must be very strong and secure so as to safely withstand the bulging strain on the cover as well as the rough handling to which such baskets are subjected in shipping, but they must also be small and compact, inexpensive, and such that they not only can be used readily by ordinary basket packers in fastening the cover, but also can be easily disconnected for removal of the cover without, in either case, causing inconvenience, annoyance or delay. The bulging pressure on the cover has a tendency to split and loosen the cover slats at the places where the cover edge is pulled down and secured to the basket, and it is particularly important, therefore, both for appearance and to safeguard the basket contents, that the fastener be attached to the cover in such a manner that it will keep the cover panels from splitting or pulling loose.

The principal objects of our invention are to provide an improved basket cover fastener of the character and for the purposes above indicated; to insure a strong and dependable fastening of the cover on the basket which is quick and convenient to use; to arrange the fastener so that the parts interengage ready for interlocking merely by pressing down on the cover edge; to attach the fastener parts to the basket and cover in such a manner that they not only will not impair the strength of the portions of the basket and cover to which they are attached, but will, in addition give added strength and safeguard the cover panels against splitting and pulling loose; to provide a fastener which can be made and applied rapidly with a comparatively simple machine; and in general, to insure a satisfactory and dependable fastener at minimum cost,—these and other objects being attained with the construction shown in the accompanying drawing in which, Fig. 1 is a perspective view of a bushel basket with cover thereon which is fastened to the basket with my improved fasteners;

Fig. 2 is an enlarged view of the front fastener of Fig. 1 with fragmentary portions of the basket and cover, to which it is attached;

Fig. 3 is a vertical sectional view through the middle of the fastener and the edge of the cover and the rim of the basket, the tongue member of the fastener being shown in full lines in the inserted position and in dotted lines in the down-turned locking position; and Fig. 4 is a top view of the cover structure of Fig. 3.

Referring to the drawing, the reference numeral 5 indicates a basket and 6 a basket cover, both of which are of usual construction,—the basket having the upper edge of the side wall secured between inner and outer top hoops 7 and 8 respectively, to which wire handles 9 are attached, and the cover consisting of a plurality of thin crossed slats 10 and 11, which are secured at their ends by staples 12 to the top edge of the marginal hoop 13, and said cover also has a top slat 14 which is likewise secured to the top edge of the hoop 13 by staples 15 and has projecting ends which engage the basket handles 9 for fastening the cover on the basket.

For securing the cover to the basket at the sides, or at points therearound midway between the handle 9 and slat 14 connection, the cover is provided with projecting wire loops 16 and the basket with tongue members 17, the latter of which originally project straight up above the top edge of the basket so that when the cover 6 is applied on the basket 5 with the cross slat 14 engaged with the handles 9, each tongue 17 projects up through the corresponding cover loop 16 as shown by full lines in Fig. 3, and by bending the top portions of the tongues 17 down as shown in Figs. 1 and 2 and as indicated by dotted lines in Fig. 3, the tongues 17 and loops 16 are interlocked so as to fasten the cover down securely to the basket at these places.

The tongue members 17 may be of any desired form such as a single strand of wire or strip of flat metal and may be attached to the basket in any convenient manner, as for example, by forming said members at their lower ends with upturned hook portions which engage between the outer hoop 8 and the basket wall, but we prefer to make these members 17 in the form of wire loops as shown having a pair of laterally spaced legs joined by a bend at the upper ends and the lower ends of the legs are preferably punched through the top hoops 7 and 8 of the basket near to their bottom edges and through the intermediate basket wall and have the inner ends bent upwardly and clinched against the inner hoop 7 as shown at 18 so that the tongue member is securely locked in place on the basket rim and projects upwardly in position to engage with a cover loop.

The cover loops 16 are also of wire with a middle portion 19 spaced from the cover a suitable distance to accommodate freely therebetween the tongue member 17 which is confined between divergent side arms 20 which extend inwardly over the end of the cover slat 11 and terminate in downwardly extending prongs 21 which are driven through the slat 11 and into the hoop 13 to a sufficient depth to securely anchor the fastener loop 16 to the cover. Obviously the arms 20 could be parallel instead of divergent, as shown, but this would bring the prongs 21 closer together so there would be greater danger of splitting the hoop 13 when they are driven down therein and moreover, if the arms 20 were parallel, there would be a shorter portion of each arm 20 overlying the end of the slat 11 and these portions would extend lengthwise of the grain of the wood in the slat 11 so that there not only would be a tendency to weaken or split the slat when the parallel arms are clamped down thereagainst in driving the fastener 16 into the cover edge, but the end of the slat 11 would also be likely to split and pull loose at the fastener under the bulging strain imposed thereon by the heaping contents of the basket. Therefore, it is an important feature of our invention that the member 16 is constructed with divergent arms 20 so as to increase the spacing of the prongs 21 sufficiently to greatly minimize the possibility of splitting the hoop 13 when the prongs 21 are driven therein and what is perhaps more important is that the divergent arrangement of the arms increases the length of the portions of the arms 20 that overlie the end of the slat 11 and these portions of increased length extend diagonally over the grain of the wood and not only obviate the possibility of splitting the ends of the slat in applying the fastener, but insure a cross grain hold on the slat which will prevent the end of the slat pulling away from the hoop 13 under the bulging strain of the heaped contents of the basket.

It will be noted that the above described cover structure is composed principally of the slats 10 and that the slats 11 and 14 are arranged one above the other at right angles over the other slats 10 in such a manner that they serve to reinforce the slats 10 against bulging strain. Therefore, when the cross slat 14 is anchored at the ends to the basket handles 9 and the ends of the cross slat 11 are engaged by the fastener members 16 in the manner indicated above so that they cannot pull loose therefrom, and the fastener members 16 are in turn securely connected by the companion fastener members 17 to the side wall of the basket, a cover attachment is afforded which not only holds the cover securely in place on the basket, but also co-operates with the cover so that the latter readily withstands the bulging strain thereon.

It is also to be noted that the members of this fastener are constructed so that they readily engage for interlocking by pressing down on the cover edge and that when engaged, the end of the tongue member projects up where it can be readily manipulated and easily bent down to the interlocking position and these members, when interlocked provide a small, compact and dependable fastener which is not likely to be disturbed or to cause any inconvenience or annoyance or injury in packing or handling the baskets and covers or in using the fastener.

While we have shown and described our invention in a preferred form and as applied to a structure in which the cover is engaged with the basket handles, we are aware that the cover may be fastened in place entirely with fasteners of the character herein described, arranged at suitable intervals around the basket, and that various other changes and modifications may be made without departing from the principles of our invention, the scope of which is to be determined by the appended claims.

We claim as our invention:

1. The combination with a basket, of a cover therefor having a depending marginal hoop, and means for fastening the cover onto the basket comprising a fastener member on the basket, and a companion fastener member on and projecting outward from the cover and having a pair of circumferentially spaced prongs extending downwardly into the said depending marginal hoop, said first mentioned fastener member being engaged with said companion fastener member close to said prongs of the latter and said members being arranged so that strains that tend to separate the cover from the basket exert a pull on the said companion fastener member in a direction to hold the prongs thereof embedded in the hoop.

2. The combination with a basket, of a cover therefor comprising a marginal hoop and thin cover material fastened to the upper edge of the hoop, a staple like fastener member having a pair of circumferentially spaced prongs driven down through the cover material and embedded in the hoop, said member having a laterally offset loop like portion clamped against the top surface of the cover material and projecting outwardly therebeyond, and a companion fastener member secured at its lower end to the side wall of the basket and extending upwardly at the outer side of the cover hoop for engagement with the loop like portion of the staple like fastener member of the cover, the upper end of said tongue member being bendable to interlock with said loop like portion.

3. The combination of a basket cover unit comprising a marginal hoop with thin cover material secured to the upper edge thereof, said unit having attached thereto as a part thereof a cover fastening member which is secured to the hoop and has a pair of arms extending outwardly over and clamped against the thin cover material and joined together at their outer ends beyond the edge of the cover.

4. The combination of a basket cover unit comprising a marginal hoop with thin cover material secured to the upper edge thereof, said unit having attached thereto as a part thereof a cover fastener member which is secured to the said hoop and has a loop portion beyond the edge of the cover with divergent arms extending inwardly over and clamped against the thin cover material.

5. The combination of a basket cover comprising a marginal hoop with thin cover material secured to the upper edge thereof, and a cover fastener member having a loop portion beyond the edge of the cover with divergent arms extending inwardly over the thin cover material and terminating in prongs which extend downwardly through the thin cover material and into the hoop.

6. The combination with a basket, of a cover therefor having a marginal hoop with a plurality of slats secured at their outer ends to the upper edge of said hoop, means which clamps a slat onto the hoop and has a loop portion projecting outwardly beyond the end of the slat, and a tongue projecting upwardly from the basket to engage said projecting loop portion.

7. The combination with a basket, of a separate cover unit therefor having a marginal hoop with a cross slot, a wire member attached to and forming part of the separate cover unit and having a loop portion beyond the edge of the cover and a pair of divergent legs extending inwardly over and across the grain of the said slat, said legs being secured at their inner ends to the hoop so as to clamp the end of the slat against the upper edge of the hoop, and a tongue extending upwardly from the basket to engage the said projecting loop portion of the wire member.

8. The combination with a basket having fastening members thereon of a separate cover unit for said basket said cover unit comprising a marginal hoop with thin cover material secured to the upper edge thereof and a pair of crossed slats overlying the said thin covering material, the ends of at least one of said slats being clamped to the upper edge of said hoop by fastener members which are mounted on the cover unit as a part thereof and co-operate with said fastener members of the basket to fasten the cover on the basket.

9. The combination of a basket having upwardly extending handles at opposite sides thereof, a cover unit having a marginal hoop and a pair of crossed slats, the ends of one of which said slats are engageable with the handles of the basket, and cover fastening means mounted on the cover unit as a part thereof at the ends of the other slat, each of said fastening means comprising a member which secures an end of the latter slat to the hoop and has a loop portion projecting outwardly from the cover at the top, and said basket having a tongue thereon which is detachably engageable with the said loop portion of said member.

10. The combination with a basket, of a cover unit therefor comprising a marginal hoop with thin cover material fastened to the upper edge thereof, and means for fastening the cover onto the basket said means comprising a fastener member mounted on and forming a part of the basket, and a companion fastener member mounted on and forming a part of the cover, the latter fastener member being arranged to secure the cover material to the upper edge of the hoop and having a laterally extending portion clamped against the top of the cover material and projecting outwardly therebeyond.

PAUL HINTZ.
ALBERT H. SCHMIDTKE.